US009038117B2

(12) United States Patent
Jones

(10) Patent No.: US 9,038,117 B2
(45) Date of Patent: May 19, 2015

(54) SYSTEMS AND METHODS FOR AUTOMATED MEDIA PROGRAMMING (AMP)

(76) Inventor: Martin Kelly Jones, Vancouver (CA)

(*) Notice: Subject to any disclaimer, the term of this patent is extended or adjusted under 35 U.S.C. 154(b) by 1541 days.

(21) Appl. No.: 12/201,000

(22) Filed: Aug. 29, 2008

(65) Prior Publication Data

US 2008/0320522 A1 Dec. 25, 2008

Related U.S. Application Data

(63) Continuation-in-part of application No. PCT/US2007/062848, filed on Feb. 27, 2007.

(51) Int. Cl.
| | |
|---|---|
| *H04N 7/173* | (2011.01) |
| *H04H 60/06* | (2008.01) |
| *H04H 20/38* | (2008.01) |
| *H04H 60/33* | (2008.01) |
| *H04H 60/46* | (2008.01) |
| *H04H 60/52* | (2008.01) |
| *H04H 60/66* | (2008.01) |

(52) U.S. Cl.
CPC .............. *H04H 60/06* (2013.01); *H04H 20/38* (2013.01); *H04H 60/33* (2013.01); *H04H 60/46* (2013.01); *H04H 60/52* (2013.01); *H04H 60/66* (2013.01)

(58) Field of Classification Search
USPC ......................... 725/86, 87, 91–93, 114–117
See application file for complete search history.

(56) References Cited

U.S. PATENT DOCUMENTS

| 6,088,722 A | 7/2000 | Herz |
| 6,104,989 A | 8/2000 | Kanevsky et al. |

(Continued)

FOREIGN PATENT DOCUMENTS

| CN | 101897135 A | 11/2010 |
| CN | 102073671 A | 5/2011 |

(Continued)

OTHER PUBLICATIONS http://web.archive.org/web/20060118050819/http://www.youtube.com/ Jan. 18, 2006, entire document.

(Continued)

*Primary Examiner* — Nasser Goodarzi
*Assistant Examiner* — Fred Peng
(74) *Attorney, Agent, or Firm* — Thomas|Horstemeyer, LLC

(57) ABSTRACT

Automated media programming (AMP) systems and methods are provided. The systems and methods allow independent users to submit, edit, rate, and watch video content (preferably, although not necessarily, from other users) over a broadcast media channel or network. In one embodiment, among others, the AMP system employs a topic generator means for determining one or more topics that will be used for identifying one or more videos to be broadcast, an upload means for receiving uploads of one or more user videos relating to the determined topics, a prescreening means for allowing users to view the uploaded user videos, a rating means for rating the uploaded user videos, their respective producers, or both, a pre-production means for scheduling the uploaded videos for transmission based upon the ratings, and a broadcast means for enabling broadcast of the videos. In preferred embodiments, the AMP system is controlled by independent users, settings, procedures for operation, and procedures for evaluations of the AMP system are user controllable.

24 Claims, 12 Drawing Sheets

(56) References Cited

U.S. PATENT DOCUMENTS

| | | | |
|---|---|---|---|
| 6,177,931 B1 * | 1/2001 | Alexander et al. | 725/52 |
| 6,493,688 B1 * | 12/2002 | Das et al. | 706/20 |
| 6,574,624 B1 | 6/2003 | Johnson et al. | |
| 7,340,466 B2 | 3/2008 | Odom et al. | |
| 7,657,520 B2 * | 2/2010 | Chen et al. | 707/700 |
| 7,739,261 B2 | 6/2010 | Zeng et al. | |
| 7,836,093 B2 | 11/2010 | Gobeyn et al. | |
| 8,112,310 B1 * | 2/2012 | Yehoshua et al. | 705/14.42 |
| 8,549,016 B2 | 10/2013 | Stefik et al. | |
| 8,625,904 B2 | 1/2014 | Das et al. | |
| 2005/0097606 A1 * | 5/2005 | Scott et al. | 725/52 |
| 2006/0184977 A1 * | 8/2006 | Mueller et al. | 725/86 |
| 2006/0195887 A1 * | 8/2006 | Shusman | 725/138 |
| 2007/0016484 A1 * | 1/2007 | Waters et al. | 705/26 |
| 2008/0086752 A1 * | 4/2008 | Perez | 725/87 |
| 2008/0092168 A1 * | 4/2008 | Logan et al. | 725/44 |
| 2008/0109306 A1 * | 5/2008 | Maigret et al. | 705/14 |
| 2008/0307475 A1 * | 12/2008 | Liwerant et al. | 725/109 |
| 2009/0217330 A1 * | 8/2009 | Tash | 725/97 |
| 2009/0254962 A1 * | 10/2009 | Hendricks et al. | 725/116 |
| 2011/0119248 A1 | 5/2011 | Abe et al. | |
| 2012/0084818 A1 * | 4/2012 | Ali et al. | 725/46 |
| 2012/0271829 A1 | 10/2012 | Jason | |

FOREIGN PATENT DOCUMENTS

| | | |
|---|---|---|
| EP | 2 192 500 A2 | 6/2010 |
| WO | 2013/032755 A1 | 3/2013 |

OTHER PUBLICATIONS

PCT Search Report and Written Opinion in co-pending, related PCT Application No. PCT/US2007/062848, mailed Aug. 29, 2008.

Canadian Office Action in co-pending related Canadian Application No. 2,644,314 mailed from the Canadian Patent Office on Apr. 3, 2014. (2 Pages).

* cited by examiner

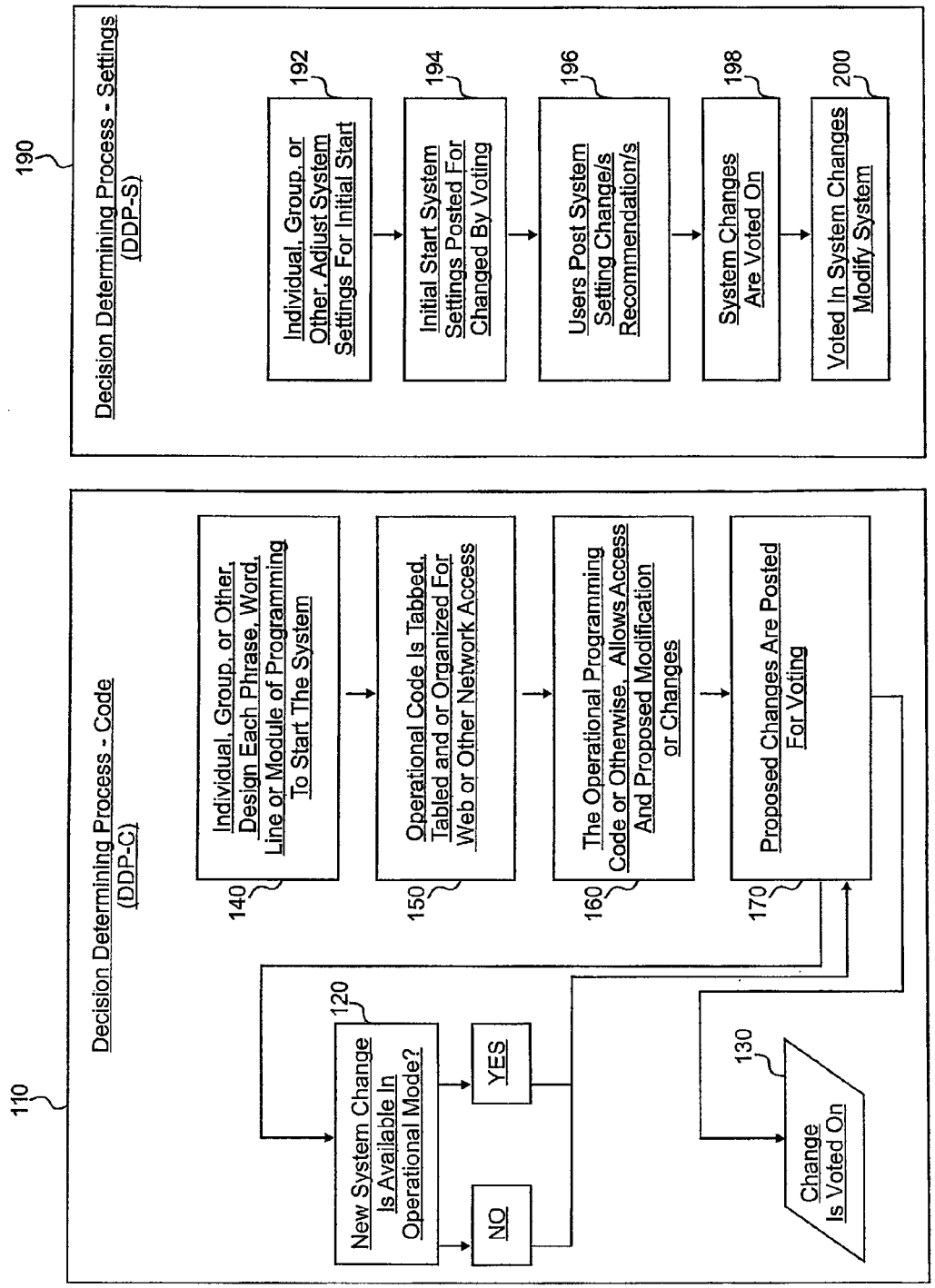

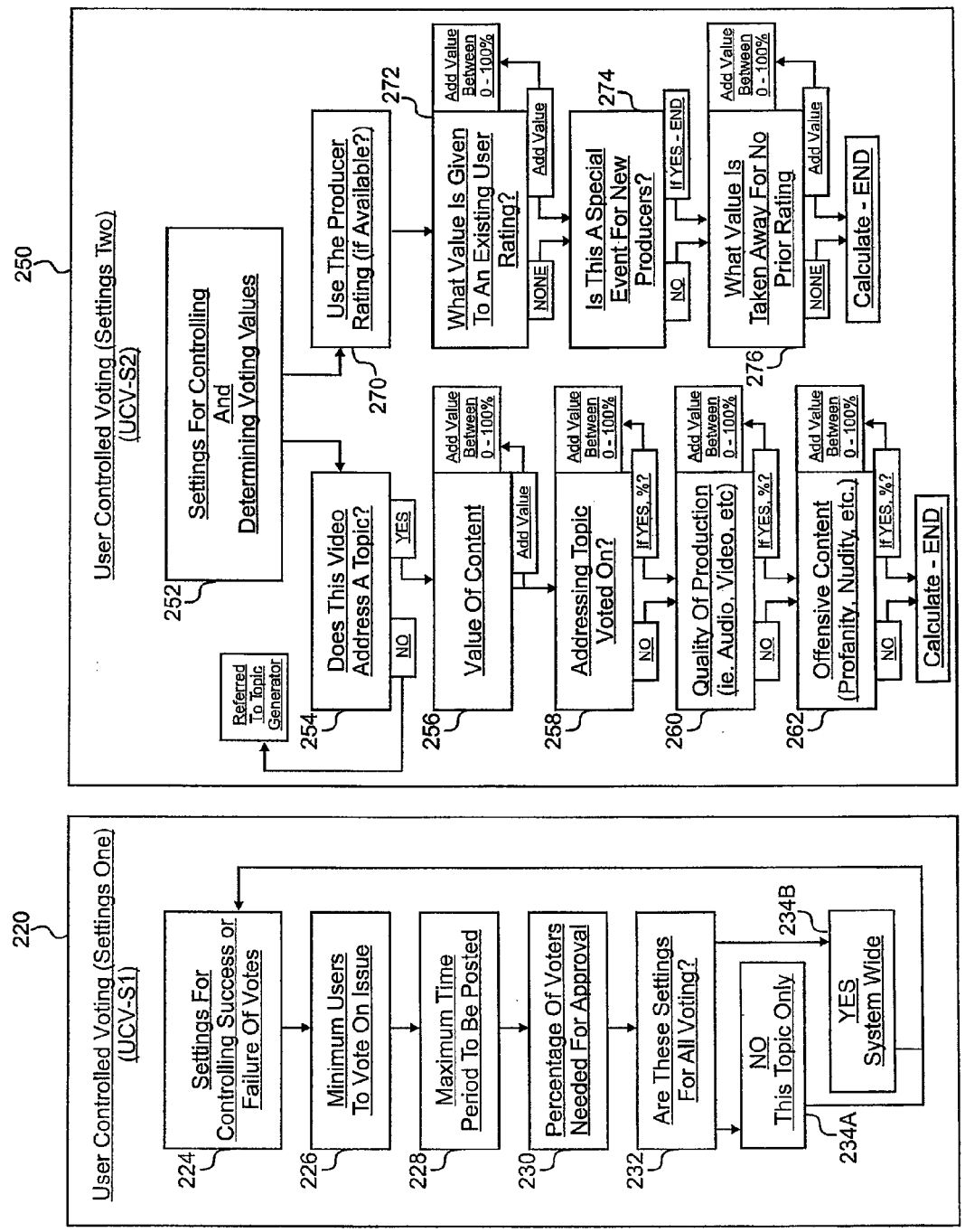

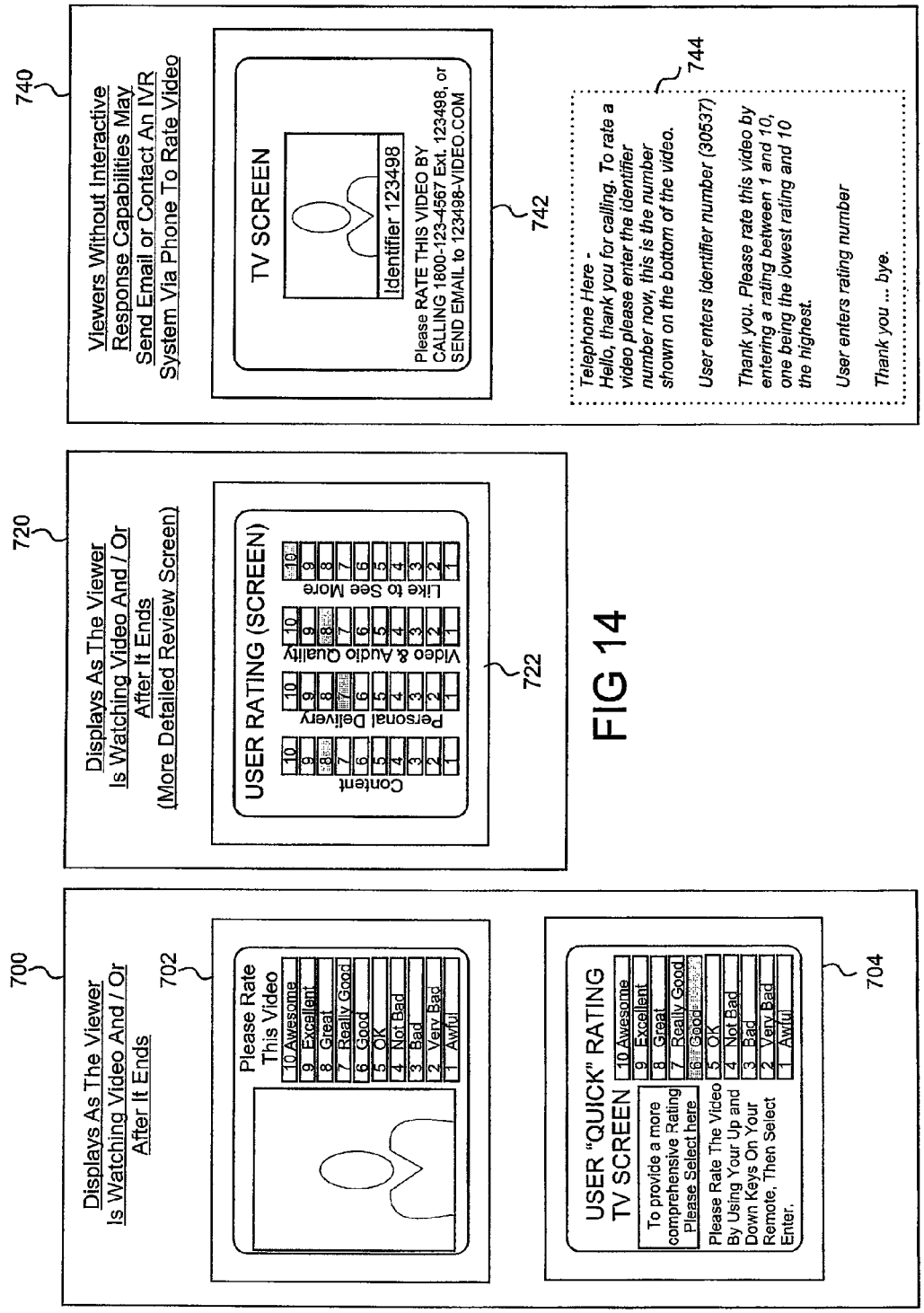

SYSTEMS AND METHODS FOR AUTOMATED MEDIA PROGRAMMING (AMP)

CLAIM OF PRIORITY

This application is a continuation-in-part (CIP) of international application no. PCT/US07/62848, filed Feb. 27, 2007, which claims the benefit of Canadian provisional application no. 2538438, filed Mar. 1, 2006.

FIELD OF THE INVENTION

This invention relates generally to systems and methods for implementing media broadcasting, for example but not limited to, broadcasting in connection with television (TV), the Internet, wireless networks, etc. More particularly, in connection with some embodiments, the invention provides automated media programming (AMP) systems and methods for effectively providing uploaded media content from independent users, addressing predetermined topics, to viewers wanting to observe high quality direct information without normal broadcast editing or censorship in any form (with limited or no edits from the networks' internal management). The foregoing systems and methods can produce other-user media content about predefined topics from other users without system operators choosing content and in many cases allowing a broadcast to be received by an individual user, group of users, or mass broadcast (i.e., television, wireless, and/or internet).

BACKGROUND OF THE INVENTION

Television broadcasting has primarily remained a one-way static industry whose production and distribution techniques have largely been unchanged for years. The techniques through which old networks, such as ABC, CBS, NBC, CNN, FOX, BBC, and others, have created productions over the years has generally remained the same. Using network controlled (owned and operated) analog and/or manually operated cameras, video tape, digital recorders, playback machines, switchers, lighting and editing systems, these and other networks have generated local and national programming combined with commercial content.

No longer are we limited to a few networks. There are hundreds of television (TV) stations, internet access, ISP applications, media sharing applications, wireless content systems, web phones, news and information toolbars, weather applications, auction assistants, shopping assistants, satellite and local radio stations, in-vehicle guidance systems, and all print and other media.

In a world of information, a source for "balanced information" that addresses two or more, or perhaps all viewpoints, is greatly needed and without regard for information that may be critical or negative toward the networks themselves. For example, if an important topic critically addressed a major news agency or station, such as Fox news, this type of information would likely be censored out and not broadcast by Fox. When users want the essence of news, straight forward and pointing out all sides so individuals recipients of news may make up their own mind, shaping news for any reason (including to sensationalize) is taking away individual choice and allowing media to be used for user/viewer manipulation. Finding "pure information" or information showing all sides or many different points-of-view, many times results in hours or hours of users searching articles or hours of watching media feeds from different networks. With such information, users attempt to determine what they believe or not believe.

Technology advancements in communication have changed the needs of many individuals from getting information, to managing or implementing techniques for sorting through the amount of the media received. Before 24-hour news programming, such as CNN and others, individuals wanting news would be forced to make themselves available to watch 6:00 pm or 11:00 pm broadcasts.

Today, obtaining unbalanced information at any time and from almost any location has become second nature for many individuals. Recent findings by comScore Media Metrix are that "over half of U.S. adult internet users have a TV and PC in the same room with half of those reporting they watch TV and use the Net simultaneously."

The challenge is not getting information, but getting "pure" and "quality information." Historically, professional news media, such as TV, radio, internet sites, newspaper, and magazines have become "overly processed" by editors, professional writers, journalist, anchormen, and announcers. Oftentimes, the media represents a particular side or point of view, and many times an unbalanced or biased perspective in order to win-over viewers from competition, to sensationalize, to report from dangerous locations, to say "our station has the exclusive" and to say "you'll only see it here," are important techniques for networks because it is about winning over viewers and increasing revenues.

Therefore, an easily accessible and more direct or pure media broadcast, not influenced by internal operators, owners, or management and bottom-lines, is needed. A pure media source direct from individuals to individuals without network influences and a user-operated broadcast channel or source for playing videos from users on predetermined topics without edits or censorship would be a great source of pure information.

Some attempts, in some form or another, to connect TV with independent users and their statement or views are now broadcast by networks by way of showing emails, statements from internet sites, and videos that were taken or captured from individuals. While the networks show content taken from individuals and not professionals, the networks select what content will be aired and how the preamble leading into video or text will be made. Not getting around potential censorship or shaped viewpoints, but telling a story as a group or how the organization management wants the story to be told.

Other attempts to air "viewer-submitted content" are seen in "Current TV" and ZeD. These companies do not get around censorship, but produce a show with some of it containing uploaded videos. While some videos are directly from users, the management of these companies select "if" something airs. (When a lot of viewers recommended a video (green lighted or recommended) it is highly considered by management. If the management agrees to air the video then it airs, and management plays other content before or after user videos. The management has the opportunity to add comments or statements that could affect viewers' perception.) Just as important, videos are not targeted at predefined topics. Viewers cannot watch videos addressing the same topic, but viewers can watch a random selection of "green lighted" videos that management organizes. At the same time, each video is introduced by a network paid anchorman.

Current TV can be found on channel 366 on DirecTV, providing a range of videos and facts from the Internet of quick short-form video segments targeted at the iPod generation (18 to 35 years of age). Segments called pods, run between two and five minutes and comprise a "mix and match" of short films on different topics (MTV-type snippets and video blogs). The producers and editors produce, select and present stories (with presenters) including information, such as statistics from Google on the top 10 news items searched, or survey data like the value of the global cosmetics market. The mix of material is produced by an in-house team of young correspondents, queries from freelancers and submissions from the audience.

As reported by Wired News on 02:00 AM Sep. 14, 2005 PT, the writer "Niall McKay" writes (complains) about the media programming and selection: "Current TV would do well to hire more smart but witty presenters like Hanson rather than the preened, sickeningly insincere porn-star types that they seem to favor for most of their segments." Maybe the key phrases are "hire" and "they like to favor." Is their selection of what airs, by whom, and when to censor good or bad? They, the producers or correspondents, control every aspect and therefore control the ability to shape content to match a predetermined age group, to match "what they feel" the audience wants, and to censor out or to add additional areas to any story.

Current TV is an independent media company, led by former U.S. Vice President Al Gore, lawyer Joel Hyatt, and a team of industry professionals and young people. The cable television network went on the air in 2005, at midnight EDT (4:00 UTC) on the morning of August 1st. Until the minute before the launch, the channel carried Newsworld International from the CBC. Current TV is based off of an experimental 3-year-old Canadian show called ZeD, both of which rely on viewer-submitted content.

ZeD is a Canadian television series which bills itself as "open-source television." It premiered in March 2002. The program, which airs every weeknight on the CBC, airs original music, short films, animation, performance, visual art and spoken word pieces from around the world. The subject matter is mature, and each episode begins with a humorously-worded call for viewer's discretion. Each episode is 40 minutes long and there are no advertisements within that time. While the show does not run in the summer, its website allows people to continue viewing certain works, and also upload their creations onto the website, which might then appear on television. Although some films are not available on the website, viewers of the television show can e-mail ZeD and request replays on Fridays, which are dubbed "Feedback Fridays". Altogether, the website claims over 40,000 members.

Yet another way for users to watch videos from-other-users includes upload storage and/or hosting sites such as YouTube. YouTube is an online free storage and video viewing website. Currently, YouTube hosts over six million videos and claims to be growing at about 20 percent every month with the current videos taking up 45 terabytes of storage. Other similar sites include blip.tv, Atom Films, Dailymotion, Internet Archive, Google Video, Ourmedia, Revver, Eefoof.com, Panjea.com, dabble.com and many more. Not to mention the ability for management or owners of these sites to promote their own chosen materials for the front page. Any information presented to the users, by its management, has the potential to be used for swaying an audience toward its own view point. As an example, YouTube writes: "People always wonder how videos are chosen for the homepage and as part of our effort to improve communication with you, I thought it was time to introduce you to some of our editors and give you a glimpse of what goes on behind the scenes here at YouTube. First up is Big Joe Smith—everyone say, "Hi Joe!"—who made this video for you and then outlined a typical week on homepage duty (including some extra video goodies). Let us know if you like this kind of stuff and we'll make it a regular feature. I'm even charging up the battery on my own video camera and getting out the rouge and mascara .

One major problem with video hosting sites, users registered or not, is searchable labeling for the video being correct with only user supplied text. Therefore existing search engines rely on searchable text, and videos do not have searchable text within each video, unlike most web pages.

As these sites host larger databases of information, the inherent challenges for all users of video hosting type sites are finding relevant and high quality information about specific topics. Even when topics seem to match users' criteria, the time associated with accessing and playing these files, only to determine that the description did not match the actual information, or the quality of the information is poor, sends most users back to text based internet searches where information is common from users of these sites. Even when users find videos matching searchable descriptions, users normally find these uploaded videos having different subject matter than described.

Another challenge for users wanting high quality videos on specific topics, includes being able to seek professional, serious or appropriate acting people in their videos. Others may seek people in videos that come from certain areas, particular backgrounds, have similar life styles, political view points, similar taste in music, have back grounds in topic areas and many other criteria that help people locate specific information by high quality producers and not waste time viewing non-useful information.

Thus, I have recognized that a user-operated broadcast with its "users" having control over content, to the extent possible, is greatly needed. More specifically, there is a need for a broadcast system that allows users to determine topics, that allows users to determine how much time each topic is given (videos discussing a topic for 15, 30, 45, 60 or more minutes), that allows users to edit or make recommendations to the independent producers of videos, that implements a pre-screening rating system and a user "producer" rating system (normally from past videos), that permits information about the producer to also be aired on screen with each video, and that implements user selected criteria for automatically forming algorithms that assist in balancing both sides of any topic (example, the users of this program voted to air 33% democratic view points, 33% republican view points and 34% of other candidates), all without organizational censorship associated with broadcast companies or organizations.

SUMMARY OF THE INVENTION

The present invention provides various embodiments of systems and methods for implementing media broadcasting (television (TV), Internet, wireless, etc.).

One embodiment of the invention, among others, can be summarized as a method for a broadcast system having the following steps: defining a time or time period indicating when media content (videos, images, sound recordings, or other user perceptible information) that pertain to a topic will be broadcast; permitting users to rate the media content that pertains to a topic prior to the time or time period; and broadcasting the media content that meets predefined rating criteria at the time or during the time period. Another embodiment is a broadcast system that is designed to implement the foregoing steps.

Another embodiment of the invention, among others, can be summarized as a broadcast system, comprising a means for permitting users to rate media content (videos, images, sound recordings, or other user perceptible information) that pertains to a topic prior to broadcast; and a means for broadcasting the media content that meets one or more predefined rating criteria.

Other embodiments of the present invention, among others, provide an integrated broadcast media system capable of receiving, managing, generating, and distributing broadcast content to a large number of remote users (viewers). In the typical embodiments, the automation for determining what airs and its calculating criteria is user defined and controlled. Maintaining an openly-controlled media content broadcasting system relies on users, compared to an internal management group, controlling system changes, filters, views, voting criteria, and almost all of the decisions.

User videos in-part are selected by an individual CVR (current video rating) on each video in a prescreening area and compared when possible to a UPR (user producer rating) normally averaged from past/other videos from the same user or group. Automated screening from the MCP (media content programming) system may also be utilized (compliance to length/time, topic, content rating (profanity, nudity), etc). This invention, in most cases, removes the requirement for internally paid professional news anchormen, actors, journalist, announcers or anyone that could be influenced by owners or producers from the network.

Some other embodiments of the invention automatically broadcasts to a TV or an Internet communication system for allowing users to completely or in-part control the broadcast. Such systems and methods involve receiving videos from users and implementing a user video selection (UVS)/rejection prescreening process for allowing users to rate videos. An email system may also be utilized to notify users when a video was selected for airing, and a broadcast system for automatically airing the selected videos over a TV, Internet, or wireless network.

Additionally, the automatic media content programming (MCP) system may utilize other rating systems for determining the quality of the videos, if videos follow preset agendas/topics and others. There may be time-urgent news (such as in a national state of emergencies, war, etc.) that bypasses the normal (UVS) user video selection process and posts videos for immediate attention (for voting approval). In emergency events, notifications are send to users for fast video uploads and viewing approval of others.

Embodiments of the invention may also include a TG (topic generator) that offers topic programming. Topics are determined by users, research (news), seasonal topics, and others. Then users view these topics and develop content based on such topics. Newly added topics may be voted on by users for determining which topics have the highest rating or relevance for collecting content and broadcasting. A higher amount of votes could automatically allow a topic and/or may move it up in a scheduled air broadcast time.

In other embodiments, the broadcast system may be designed to permit users to recommend changes to the MCP internal algorithms and selection processes (ASP) that are part of the programming, code, or methods that determine how videos are selected or displayed.

In yet other embodiments, the broadcast system may be designed to permit users to predefine onscreen viewing positions when full screen videos are not used. As an example, the user may also provide additional personal information or links to additional information, such as a typed transcript or additional information that may be typed or other videos. Another example of additional onscreen information includes a continued (longer or addition) video of what was aired.

In still other embodiments, the broadcast system may be designed to permit users to provide location information (GPS, Mapping, Address, or other location determining information) that may be used for determining the recipients for viewing a location based video. The system allows the recipients to select videos within or at a predetermined location. For example, users in a traffic jam may submit a request for videos within a certain location, within a certain time, on same or similar roads or a point of interest nearby. As another example, users traveling toward roads automatically see road conditions from other cars or land based video cameras. Automatic triggering events for broadcasting road conditions may include actual speed of vehicles, average traffic flows, or distance away from the approaching road.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 shows a flow chart of the decision determining process for code (DDP-C). The system can allow users to change or modify any element of operational design. The code is tabbed, tabled, and/or organized for users to access and build recommended changes or add-on modules for other users to review and vote on.

FIG. 3 shows a flow chart of the decision determining process for settings (DDP-S). The system can allow users to change or modify any setting. Users can vote to modify the system.

FIG. 4 shows a flow chart of the user controlled voting settings (UCV-S1). These settings control whether the voting is a success or failure for the complete system or individual topics.

FIG. 5 shows a flow chart of the user controlled voting settings (UCV-S2). These settings control the voting values. Voting values are used to calculate components, in this example videos and producer. Each component's value may be adjusted to reflect importance within each area.

FIG. 13 shows an on-screen area for allowing users to rate videos.

FIG. 14 shows possible methods for enabling the user to rate the producer. Producer ratings may be automatically generated based on historic information or user selections or a combination of these and more.

FIG. 15 shows different possible methods for enabling users to rate aired videos by email or telephone.

DETAILED DESCRIPTION OF PREFERRED EMBODIMENTS

The present invention provides various embodiments of systems and methods for implementing media broadcasting (television (TV), Internet, wireless, etc.). Although not limited to the following configuration, the preferred embodiments of the invention are implemented in software executed on a suitable computer system, i.e., a server, which may or may not have a distributed architecture, that is communicatively coupled to the internet to enable access by users via other suitable computer systems, i.e., a clients. The server produces a web site that is accessed by the client computer systems.

In the preferred embodiments, the system limits owner or management influenced content, while providing users information on topics with the highest quality videos within a main stream or personalized broadcast. This invention, in its personalized broadcast on-demand or user-specific broadcast embodiments, allows each user to define what determines higher quality videos through matching a user definable preference area. One embodiment, among others, comprises an automatic production system, an automatic broadcasting system, a video and producer sorting system, a user video prescreening and rating system, a producer rating system, a producer payment system, an advertisement system, a broadcast viewer rating, an automated and or manual topic generator, an open architecture configuration and a settings module for allowing users to modify or change one or more system settings. Furthermore, although the present invention is not limited to this particular configuration, this illustrative embodiment broadcasts media content in the form of videos and/or images, as described hereafter.

The automated media programming (AMP) system operates from user information collected by the website. Each user visits the AMP website 18 and sets up an account by entering login security, personal self-descriptive information, and personal preference information. Once the user has an account, the user may watch and vote on videos in the prescreening areas, vote on topics or recommend new topics, setup criteria for the selection of videos, setup personal broadcast information, vote on system changes, and be part of the control process of the AMP system.

In the preferred embodiments, a user is defined as either an interactive user (IU) or a viewer only (VO).

Videos

Figure 1:
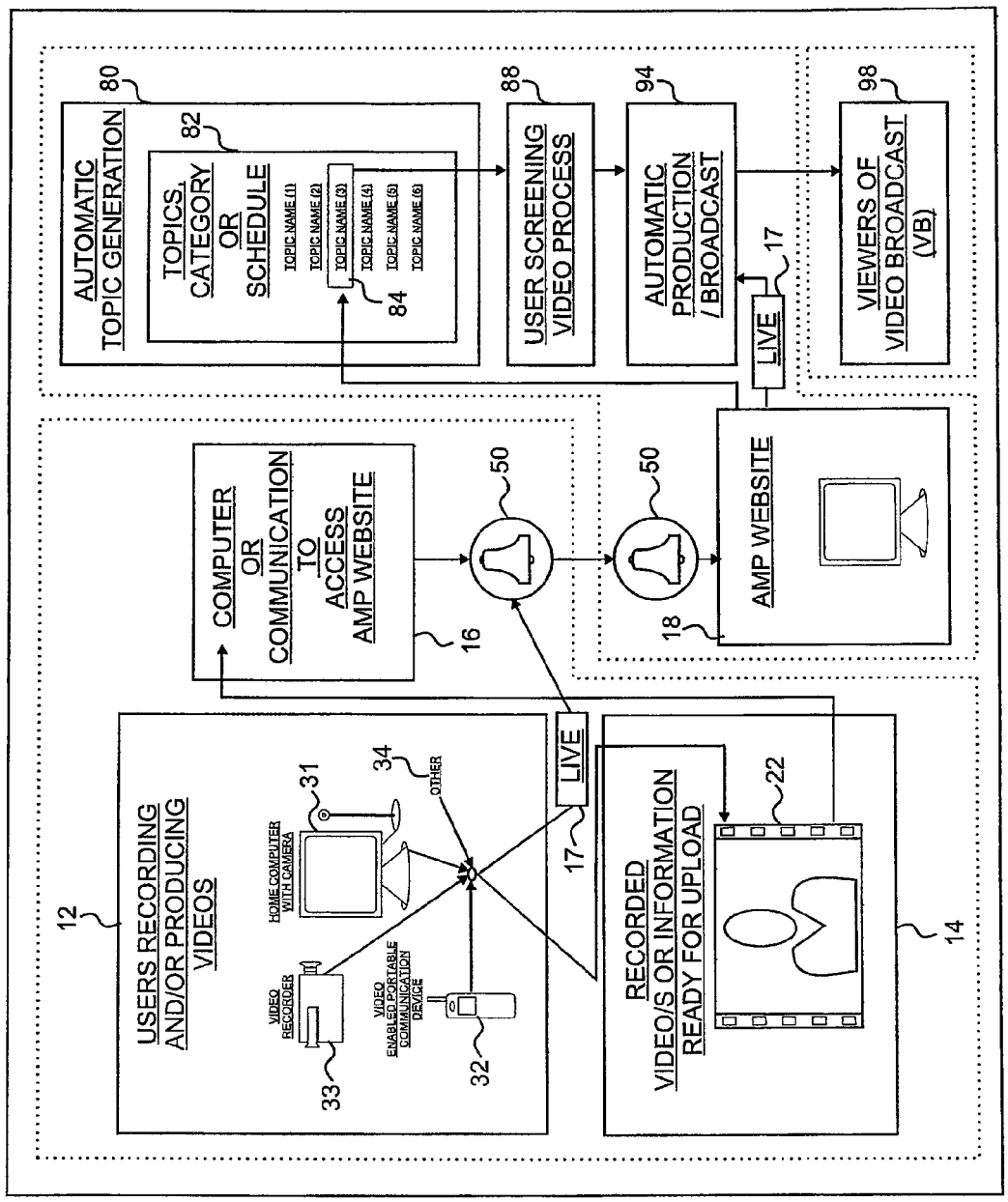
FIG. 1 shows a high-level system diagram of an example embodiment of an automated media programming (AMP) system in accordance with the present invention.

Referring to FIG. 1, for users wanting to become producers, or interactive users (IU), the system acquires its broadcast contents by users capturing and then uploading videos. These videos 22 are taken by 12 wireless portable devices (video enabled PDAs, wireless/cellular phones, etc.), camcorders, computers equipped with video capabilities, or any device capable of capturing video or still images with narration.

It should also be noted that live video 17 feeds from producers may also be used within this embodiment. Examples of when live video feeds are used, include but are not limited to, late breaking news, events or concerts, where two or more users at a location but in different areas that are showing different perspectives or view points, before, during or after a user video is played, based on a location and people moving.

Video Uploading Area (UA)

For pre-recorded videos, the uploading area (UA) is located on the AMP website 18 and is used for storing and filing videos based on a predefined topic. Each user logs into his/her account before entering into this area. After logging in, the user may access the area by clicking on the tab (marked "Uploading Area"). Each user may upload videos on a specific topic.

The UA area contains a list of topics 82. Each user selects which topic 82 the video addresses. While the user may place a video in the holding tank (limited disk space), this is normally done only for users compiling additional footage and not used as common storage. After edits are completed, and the topic is selected, the user may publish the video into the prescreening area.

Video Editing

After the video is uploaded, the user may select video editing tools from the menu. Some of the features may include, for example, cutting/pasting, reducing the length, adding narration/audio, changing the background, combining two or more videos, rendering video with animation or user personal information, etc.

The user matches the video with the topic 82 inside a prescreening room/area. The prescreening area 88 offers other users the ability to watch and rate each video and producer within this area. In the embodiment for a timed broadcast, unless enough positive votes are received and/or the video is pre-selected, the video will remain in the prescreening area until a deadline has been reached. After the time limit has been reached, the video is archived for viewers to watch at any time or later date.

In an embodiment wherein users receive a personalized broadcast, each video will be rated, but stored for retrieval. When user defined information matches this video, it will be selected for a personalized or tailored broadcast.

For videos successfully passing through the voting phase of a timed broadcast, the video moves from the prescreening area to the preproduction area. The preproduction area organizes videos with a schedule and potentially adds advertisements. The copy-right releases and all necessary releases for airing the video were received at the time of the upload. At this time, the producer (user) is notified on the exact time and date of the video airing.

The video waits in the preproduction area for broadcasting at its scheduled time. Viewers may visit the website or receive programming scheduling updates via email or other wireless messaging service.

Viewers watch scheduled programming of videos from individuals on predefined topics. The videos that each viewer watches during a broadcast are videos focusing on topics normally from the topic generator FIG. 6.

Control Processes and Systems

To operate a fully automated AMP system without internal management takes user inputs or user recommendations guided by majority votes from other users of the system. Many user systems for this embodiment will be described in detail.

User Profile

Each user signs up for an account. The information provided in the users account will be utilized when the video is played. As the user obtains a producer rating, the information will help manage topic and broadcast balance (for example, 33% republican, 33% democrat and 33% independent) along with male/female balancing, age balancing and endless others.

As an example, the user enters the following information: TABLE-US-00001 "Email account information=myname@host.com" "User Name=" "Password=" "Age=" "Male or Female=" "Political Party=" "Hobbies=" "Published Work or Articles=" "Street Address=City=State=Zip=" "Telephone #=" "Notification Y/N=Selected Topics Only Y/N=" "Please click all topics of interest (see topics list)"

The user profile also contains historic information, such as a list of uploaded videos, amount broadcast to date, average rating of each video, the producer rating, etc. The producer rating may also show the paying level (example, your rating is 6.3—raise your rating by 1.7 to 8.0 and start making money!). The historic information may also provide a rating balance that shows how the user rates against the majority votes.

Prescreening Area

The prescreening area (PSA) is where videos waiting for potential airing, are viewed by other members, and rated (for example, 1.0 to 10.0 scale, with 10 the highest rating). As a video is being viewed, questions popup for the reviewer to answer, and at the end of watching the video, the viewer is ask to rate the video.

As an example, the user can be provided with the following options that can be selected by the user:

1.) Watch videos within the topic area
2.) Rate each video
3.) You may write the producer a message for encouragement or for suggestions
4.) See which videos make the cut (if they air on a broadcast)
5.) Review feedback from others that have watched your video
6.) Ask to be notified via email or in a message area, if someone rates your video lower than a predefined level.
7.) Notify other reviewers after you have edited your video.

Highest Rated Producer Area

The highest rated producer area allows users to watch the best in action. The best producers are in a list starting from highest rated. To the side of each producer is a tab to review their works, those from the past and those waiting in the prescreening areas.

Production Room

Users with web-access may watch live broadcasts from anywhere. They can watch the same broadcasts as individuals watching on TVs.

Audience Rating Area

While all videos are watched in the prescreening room by other users, the audience rating area allows viewers (members or non-members) to rate each video in a broadcast. There are many methods that can be implemented for enabling non members to rate videos, examples of which are as follows:

1.) email response (with video identification number) with rating
2.) go to AMP website and enter "rate a broadcast video"
3.) call from any telephone, into the AMP interactive voice response telephone entry system
4.) respond to onscreen TV areas
5.) respond to pop ups or video overlays User Subsystem Each user subsystem will now be described in detail. These are systems that allow the AMP operations to occur without onsite management or that allow the AMP system to be controlled by its users.

Figure 6:
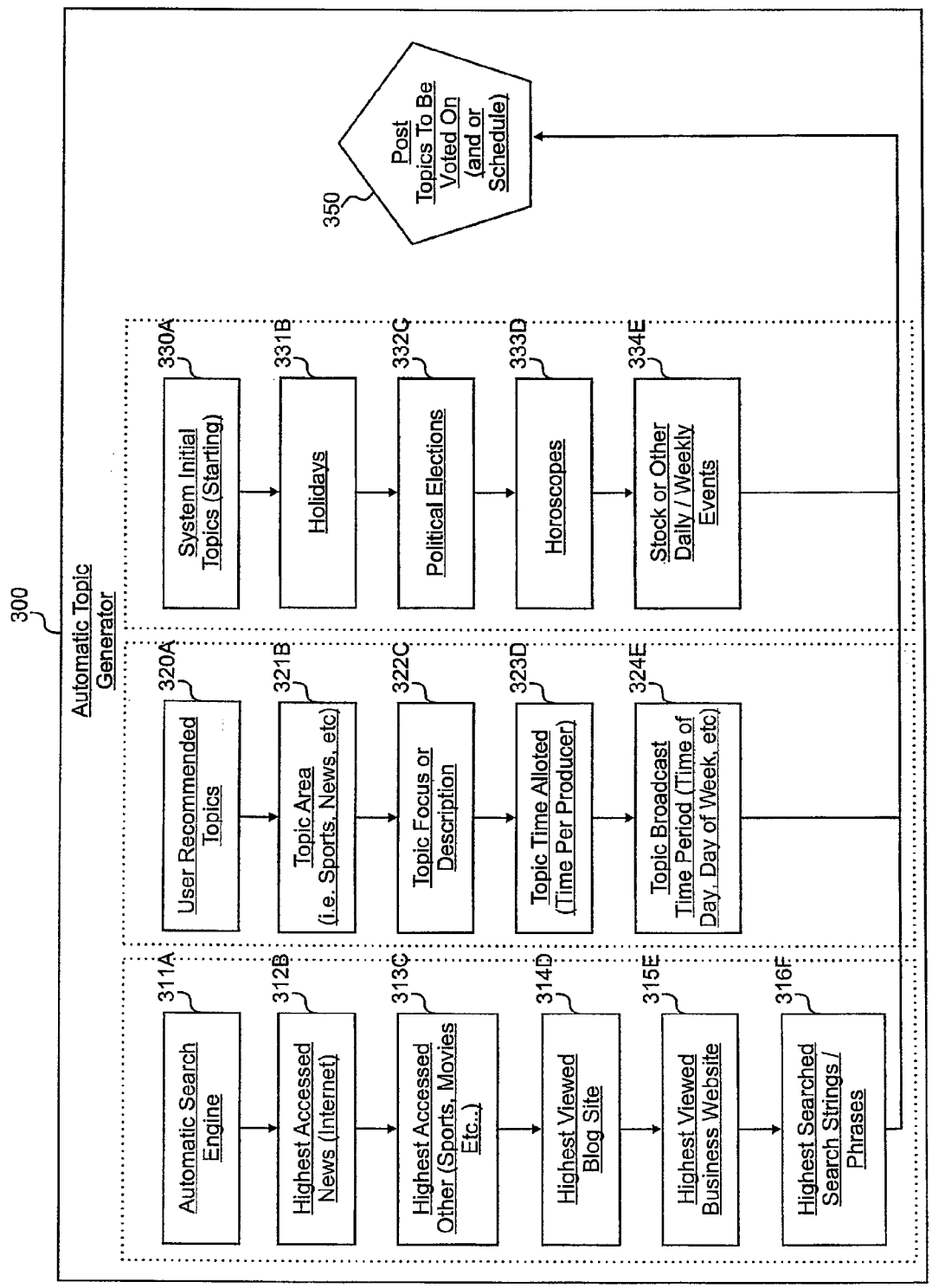
FIG. 6 shows a flow chart of the automatic topic generator (ATG). The diagram shows examples of some of the systems used for generating topics needed when users upload videos.

The automatic topic generator of FIG. 6 provides topics to producers. These topics are used as scheduling spots (time periods) that videos address within this time period. A topic is given a total time period by voters. The topics are generated by three or more main areas:

1.) Automatic search engine 80 that looks for the highest accessed news 86*b*, sports 86*c*, movies 86*c*, blog site 86*d*, highest viewed business website 86*e*, and highest used search strings 86*f*.
2.) User recommended topics 87*a* where a user names a topic area 87*b*, description 87*c*, time allotment 87*d* and time period 87*e*.
3.) The system initializes topics 88*a*, such as holidays 88*b*, political elections 88*c*, horoscopes 88*d*, stock, or daily events 88*e*. The topic generator recommends topics, but the users vote on topics they would like to see videos address.

Figure 7:
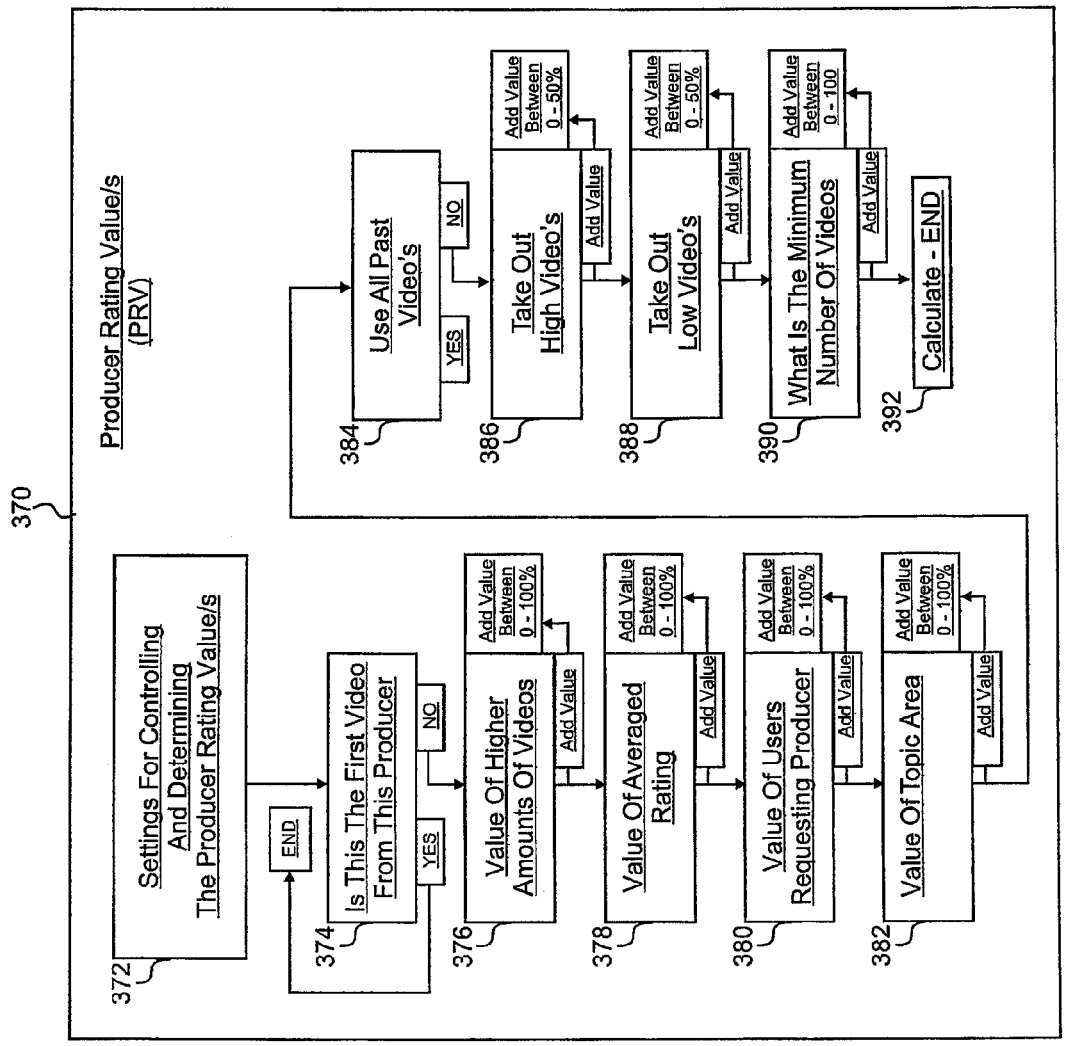
FIG. 7 shows a flow chart for determining the producer rating value (PRV). The producer rating value is sometimes calculated with the video rating, and then used as an overall value for passing or failing user videos.

FIG. 7 shows the subsystem for determining producer rating values (PRV) 370. The producer rating is calculated into a video rating. For example, the PRV may be 8.0 but the producer's last video may have been rated a 6.0. The PRV determines the calculation for determining a number for the video. The criteria may include the amount of prior videos 376, the averaged rating 378, how many users request work from this producer 380, what is the value of the topic area this producer works within the majority of the time 382, use all or some of the past videos 384, 386, 388, what is a minimum number of videos before calculations start 390, etc.

The users determine the calculations for the most accurate balance between producer ratings and video ratings. It should be noted that videos control, at least in part, the producer rating. Examples of FIGS. 13, 14 and 15 show screens for both prescreening and in the broadcast. Videos are judged by AMP users and observers of the AMP broadcast. FIG. 15 shows how a user watching a broadcast on TV may respond (rate) to a video by email or calling into the system. Additionally, it should be noted that an easier method to rate a video is within an interactive TV system that allows the user to enter a rating on the remote (or keyboard).

Figure 8:
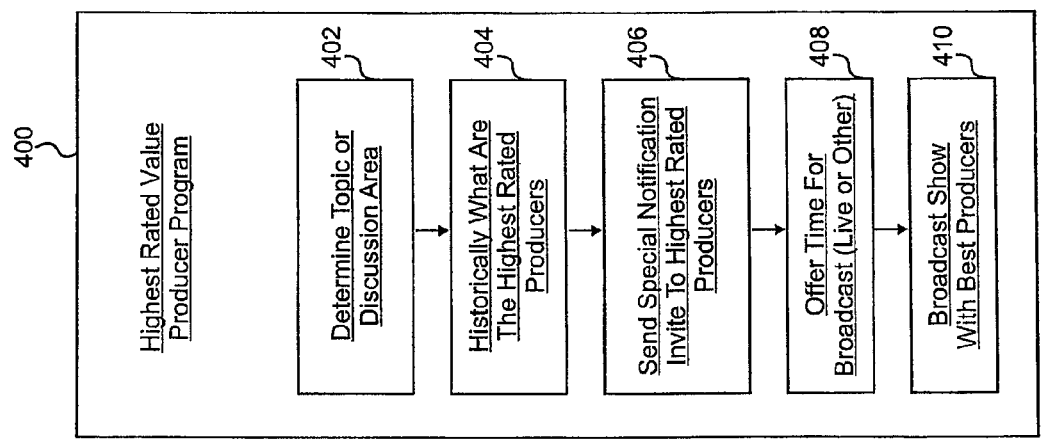
FIG. 8 shows a flow chart for the highest rated producer program (HRPP). The system may promote high rated producers with payments, special broadcasts, or other events.

FIG. 8 shows a highest rated value producer program. This is used for selected programming wherein only the highest producers are invited. As an example, in an emergency where fast responses are necessary, the AMP may notify the highest rated producers for a fast video or live feed.

Figure 10:
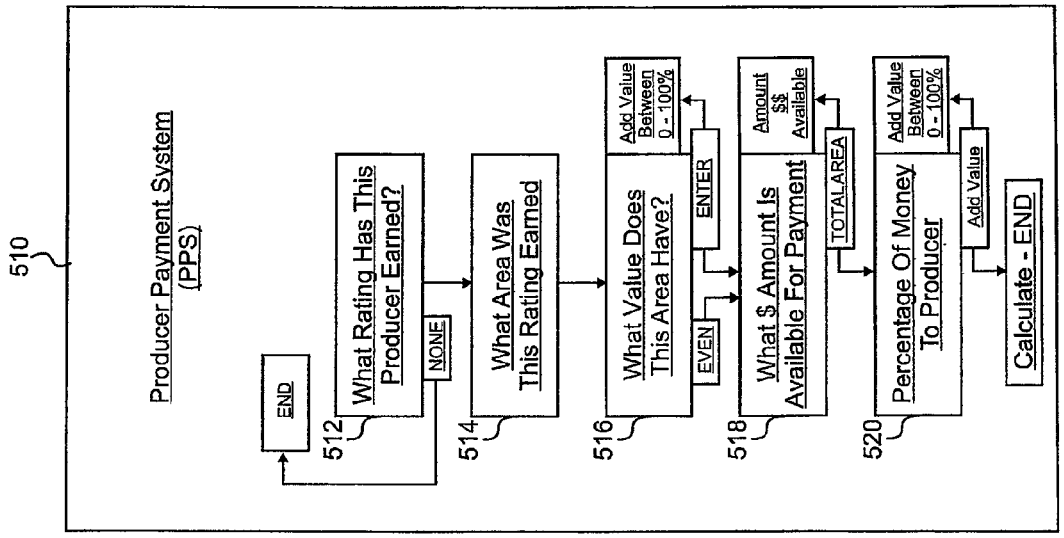
FIG. 10 shows a flow chart of the producer payment system (PPS). As producers achieve high ratings, this system may automatically calculate and pay producers based on one or more ratings. The calculation may also include part of a revenue sharing program or part of the highest producers offering viewers a pay service.

Promoting and supporting the best producers can be achieved, optionally, by payments as is illustrated in FIG. 10. The payments vary in different topic areas 516 by the rating of the producer 514, the total amount of money available for this area 518, and the percentage of the total amount to be paid to the producer 520. While the AMP system over time determines the best producers, each video and its impact to their rating (or lack of producing videos reduces their rating also) is one of the best forms of management. The automated management system rewards consistent highly voted video production, but gradually removes producers that lose their edge (lower producer and video ratings). It should be noted, many other paid programs or bonus programs are in effect, such as payments for "fast response" videos (when emergency notification is sent out on a particular topic), "best educational promotion", "best house buying video", "best investment video" or any other program that rewards the producer (not necessarily always the producer rating).

Figure 12:
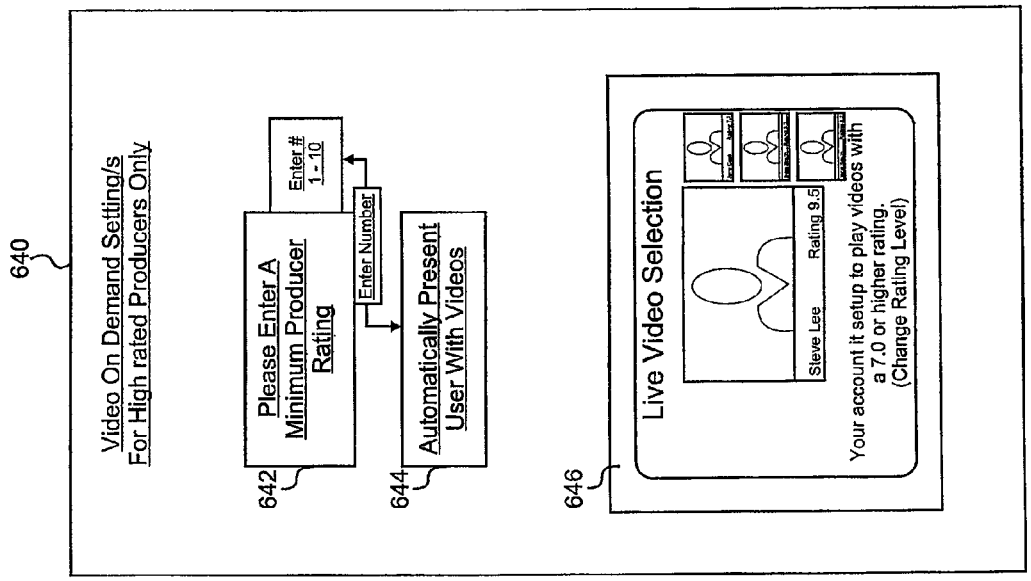
FIG. 12 shows a flow chart and diagram of a video on-demand system. The users may request videos to be played containing only highly rated producers. This allows viewers to not waste time watching videos without ratings or videos with low ratings, acknowledging lower quality.

Additionally, many AMP system setups and usage are possible without listing every scenario herein. The system may be setup to deliver user videos at predefined times or upon request. The system may be setup by users with internet or network accessible TVs to retrieve videos by predefined criteria such as news. In this form the system supplies information (videos) to users at anytime of the day or day of the year. For example, if the user wants to purchase a fuel cell electric car, then the user may request all videos on this topic. In this example, the user also chooses "only the highest" rated videos, as shown in FIG. 12, from the highest rated producers. Another example includes a user asking for new videos on topics of their choice but the video 686 and/or producer must have a minimum rating of 7.0.

Figure 9:
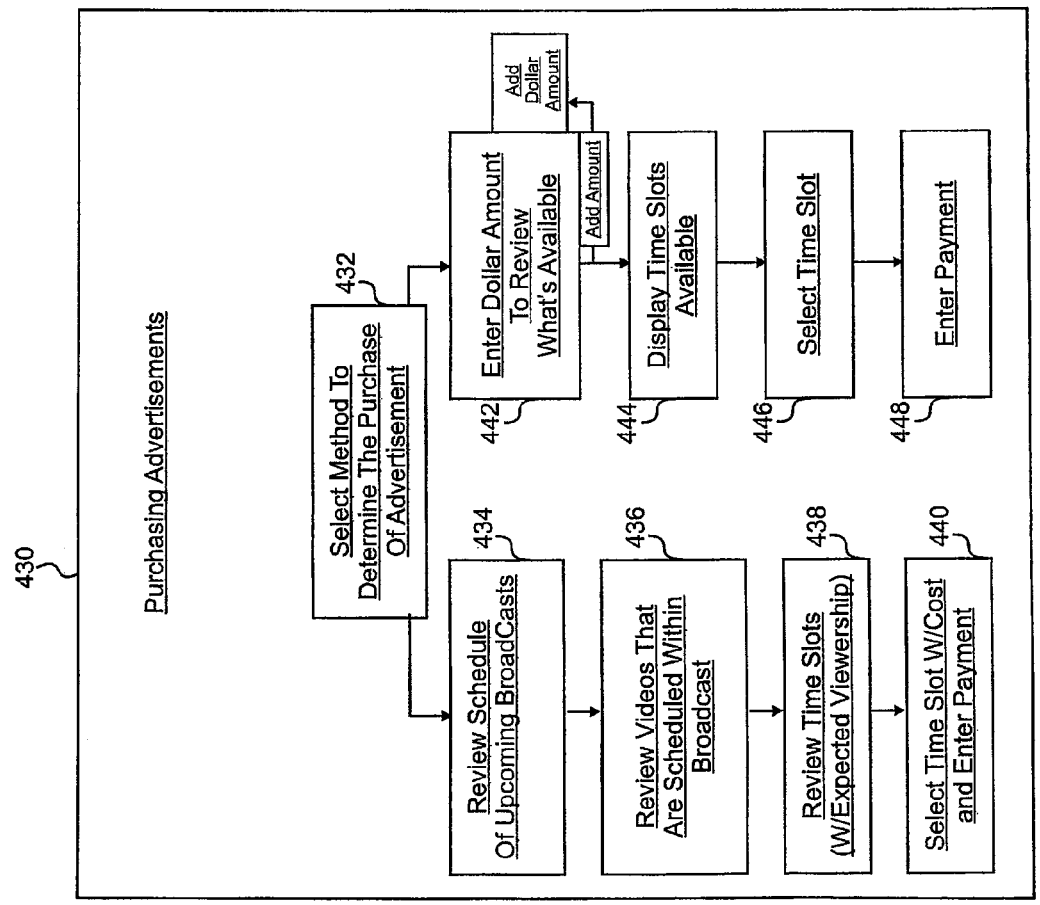
FIG. 9 shows a flow chart of an automated system for the purchase of advertisements. The example allows users wanting to purchase advertisements two options: locate time spots based on upcoming scheduled events and dollar range matching that highlights times and events based on the highest amount a user will pay.

The AMP system may incorporate its own revenue modeling and advertisement selling system. Advertisements, donations, and the promotion of videos to other reporting sources would be the main revenue stream. The purchase/sale of advertisements as shown in FIG. 9, allows users to locate advertisement spots by upcoming broadcasts 434 or simply entering a dollar amount to see what is available 442. All advertisements go through a review process similar to the video rating module, although the ad passes or fails by the voters.

Guidance from User Subsystems

AMP addresses the rules that reflect many aspects of operations as guidance user subsystems. The systems open the architecture to allow a user to change many, if not all, settings and actual systems, even the software code.

DDP-C is the decision determining process code. As shown in FIG. 2, DDP-C allows users to easily look up code using tabs or other known organization methods. The open architecture allows any user to view and recommend changes to code. The user may select an area that they believe should be modified, changed or added/removed. They may make the change and post it for viewing 338. If the change is voted in, then the system is changed.

DDP-S is the decision determining process settings. As shown in FIG. 3, DDP-S allows control settings to be adjusted by the AMP users. Users recommend 356 changes, these recommendations are voted on 358 and when voting approval is given the system settings are changed 360.

Figure 11:
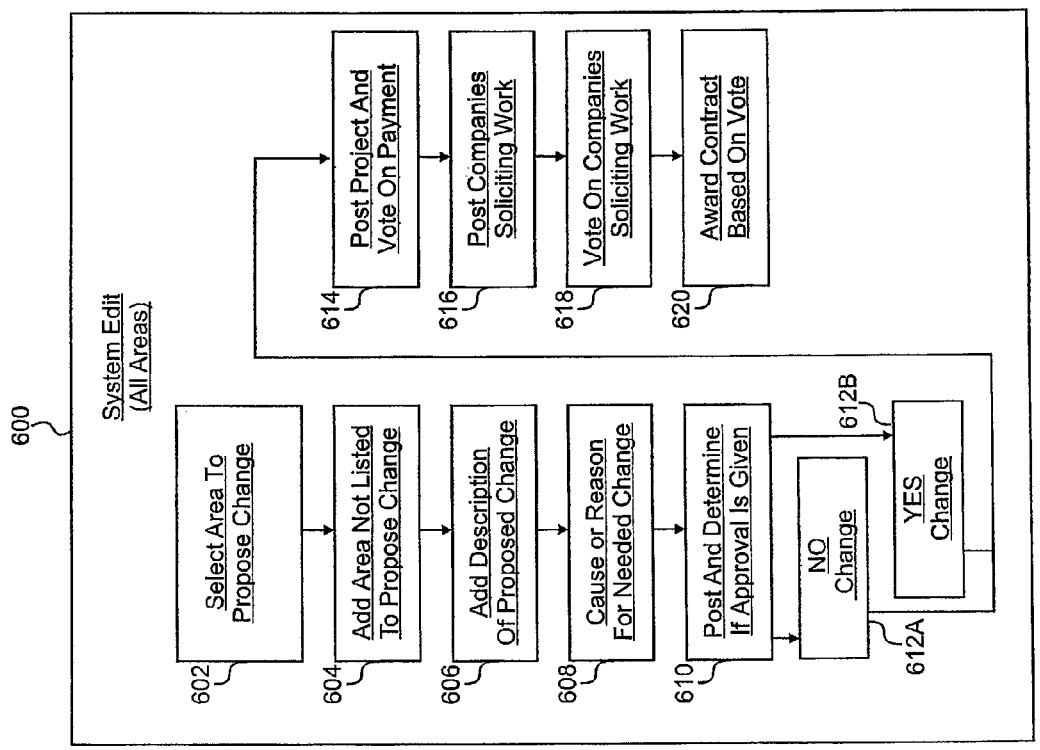
FIG. 11 shows a flow chart of the system edit. Users control the system and may introduce modifications, changes or additional areas for users to vote on. If a change is passed, the proposed change may be posted to companies to write new code.
Figure 16:
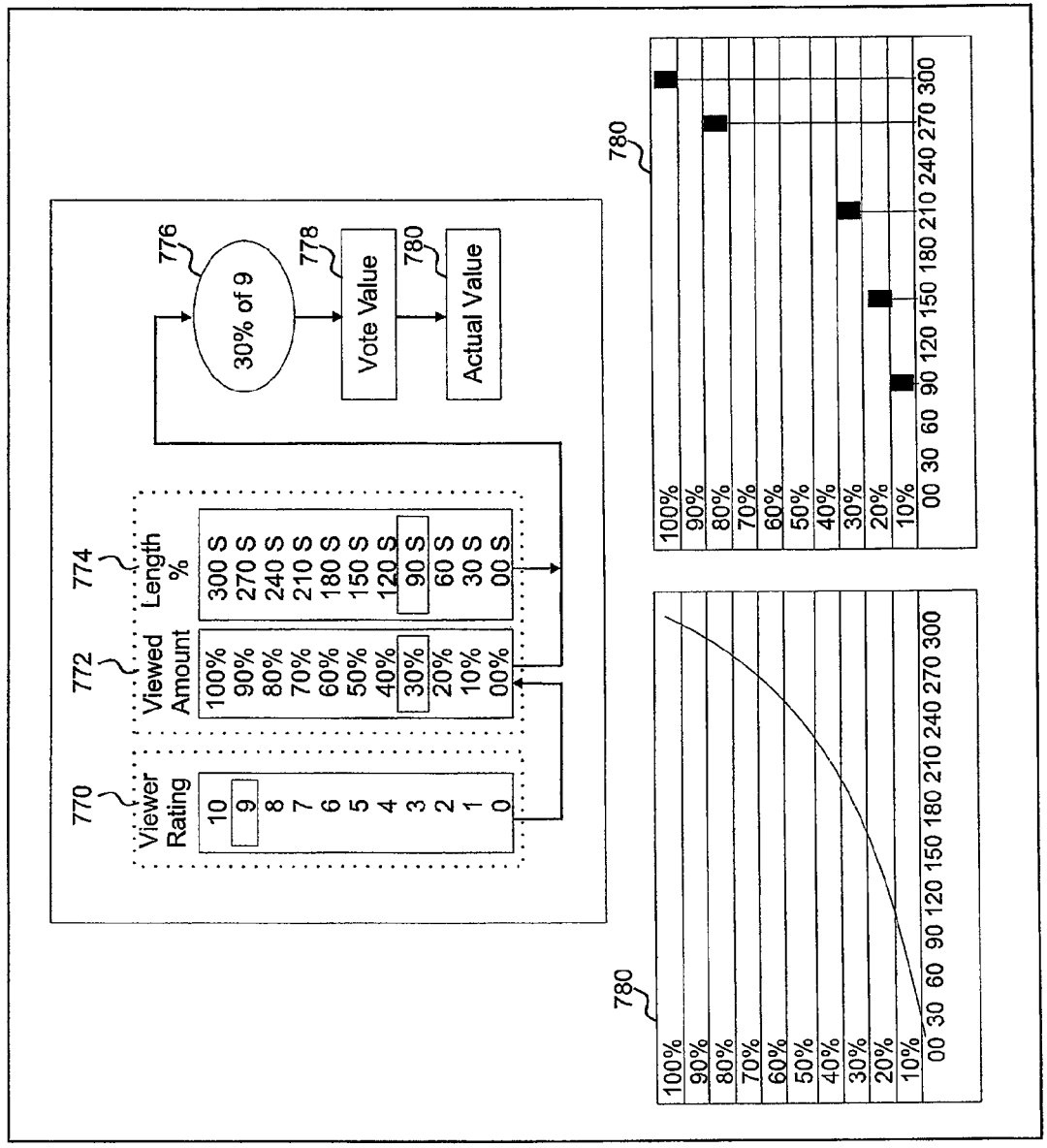
FIG. 16 shows one of the methods for determining the quality of each user's vote to determine the weight, if any, it will be accorded by the system. In this example, a user's vote is compared to the amount of time the user watched the video. Users watching the complete video may have a stronger vote, as opposed to a user that only watches 10% of the video then rates the video. Although not shown here, it should be noted that if a preset percentage (as an example, 90%) of the viewers stop watching the video early, additional calculations may be made to balance the overall rating score.
Figure 18:
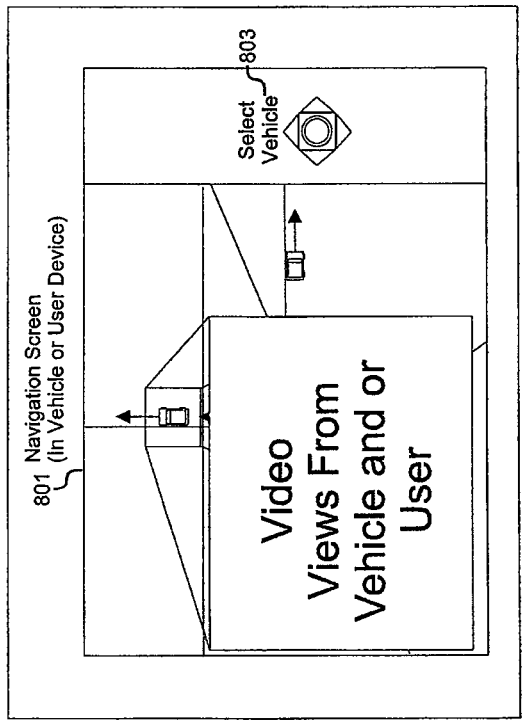
FIGS. 17 and 18 show an example of videos taken while moving (VWM). The example illustrates users recording traffic or road conditions from vehicles equipped with cameras, prior to traveling on these roads.
Figure 17:
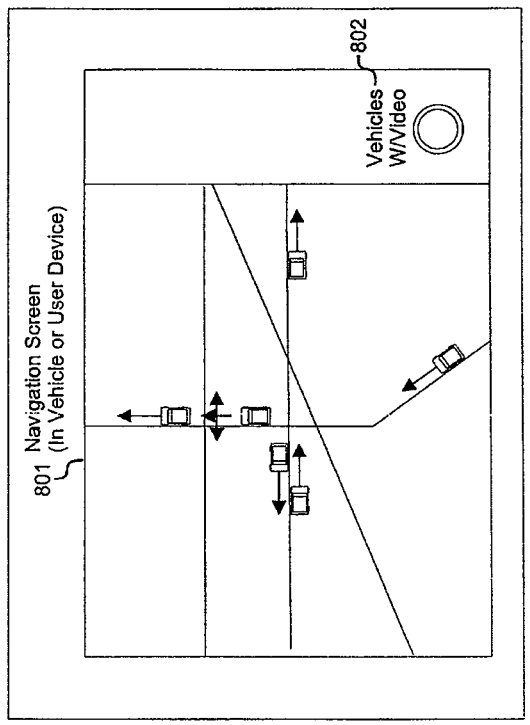
Figure 19:
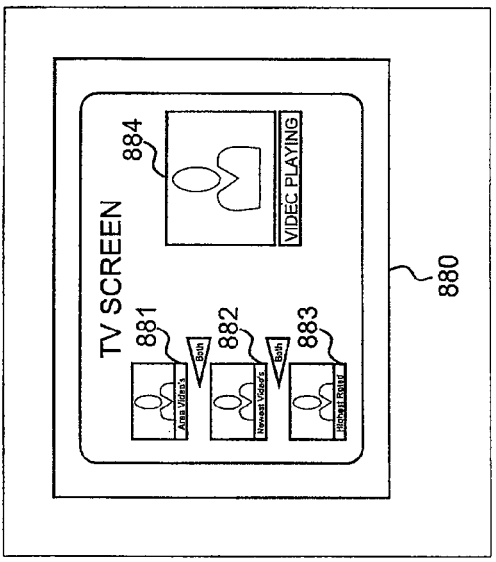
FIGS. 19, 20, 21 and 22 are examples of the many different video selection screens for allowing viewers an opportunity to watch different videos (selecting the newest video, videos with extreme view points, videos with view points based on a location, videos with view points based on the most agreed to, most opposed, or most neutral political view points, and age, etc.) It should be noted that these videos may be sorted by system or user preferences (and may include the highest rated in each area or may include matched user points of view, religion, or other characteristics).
Figure 20:
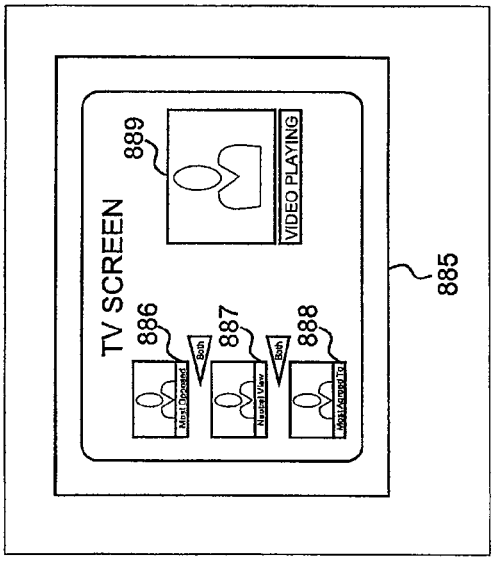
Figure 21:
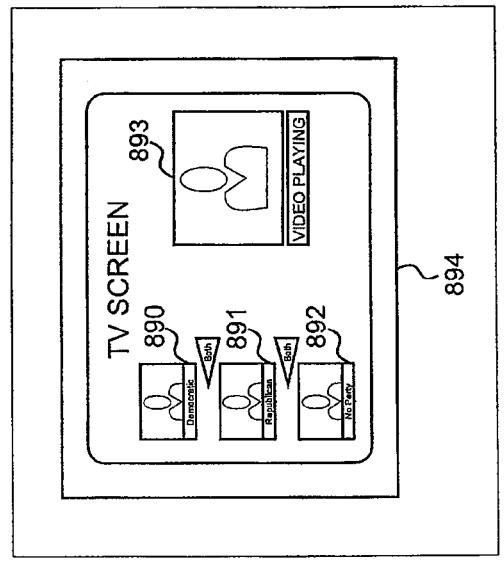
Figure 22:
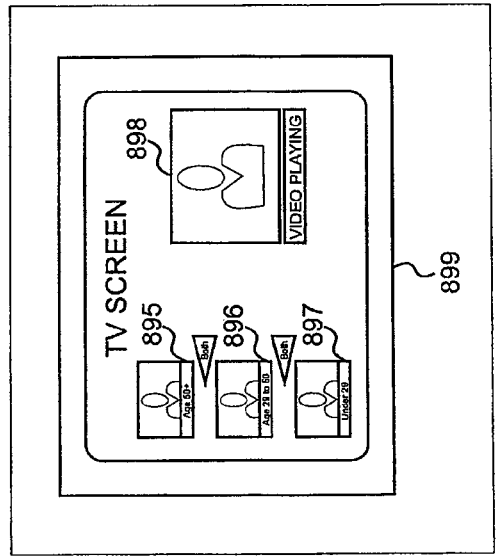

A system edit option (preferably, all areas), as shown in FIG. 11, offers system wide changes as needed. Users can select the area and describe the needed change for others to review as indicated at reference numerals 606, 608. The changes are voted on and incorporated upon approval, as denoted at reference numeral 610.

USV-S1 is the process that controls one aspect of voting (FIG. 4). This system allows the users to enter values, such as minimum users 166 to vote on the issue, maximum time period 168 to be voted on, percentage of voters needed 170, and others.

USV-S2 controls the balancing values between video ratings and producer ratings (FIG. 5). The determination values are adjusted by giving values to content 186, addressing content 188, quality of production 190, and offensive content 192. The producer rating allows adjustments for existing producers and new producers 222 224.

Additionally worth noting, receivers of broadcast may block any producer from their personalized broadcast. In the event that a highly rated producer becomes undesirable or does not match what the viewer is looking for, this producer may be blocked from future broadcasts to this user.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

At least the following is claimed:

1. A method for one or more computer servers that are communicatively coupled to the Internet and that provide a website for enabling uploading of videos, sorting the videos, and downloading the videos, comprising:

searching content on the Internet;

identifying a topic from the searched content, the topic indicative of currently relevant news or events, the topic indicative of a type of video that will be requested for uploading from producers; wherein an upload area (UA) located on the website is used for filing and storing uploaded videos based on a predefined topic;

publishing the topic on the website, the topic indicative of a type of videos that are requested for uploading;

receiving and storing videos uploaded from computer clients, the videos being associated with producers of the videos;

enabling users to select, download, and view videos on computer clients;

enabling the users to upload video ratings for videos downloaded on the respective computer clients;

determining a producer rating for each of the producers based on a video rating associated with at least one of the videos uploaded from computer clients; and publishing the producer ratings on the website.

2. The method of claim 1, further comprising establishing login information for the users.

3. The method of claim 2, further comprising:
receiving and storing user preference information or user profile information from the users; and
selecting videos to download on the computer client based on the user preference information, the user profile information, or both.

4. The method of claim 3, wherein the videos downloaded on the computer client are downloaded serially in a stream.

5. The method of claim 3, wherein the videos downloaded on the computer client are selected based upon the user preference information and wherein the user preference information specifies a broadcast time period.

6. The method of claim 1, further comprising enabling the users to selectively block videos from specific producers.

7. The method of claim 1, wherein publishing the producer ratings further comprises:
when publishing a video for download to the website, associating a corresponding producer rating relating to the producer that uploaded the website video.

8. The method of claim 1, further comprising providing access to videos uploaded by higher rated producers while preventing access to videos uploaded by lower rated producers.

9. The method of claim 1, further comprising:
enabling a user to select a point of view with respect to the topic; and
downloading a video to the computer client that corresponds to the point of view that is selected by the user.

10. An automated media programming (AMP) system, comprising: one or more computer servers that are communicatively coupled to the Internet and that provide a website for uploading and downloading videos produced by users, the system one or more servers designed to at least:
search content on the Internet;
identify a topic from the searched content, the topic indicative of currently relevant news or events, the topic indicative of a type of video that will be requested for uploading from producers; wherein an upload area (UA) located on the website is used for filing and storing uploaded videos based on a predefined topic;
publish the topic on the website, the topic indicative of a type of videos that are requested for uploading;
receive and store videos uploaded from computer clients associated with at least some of the users, called producers of the videos;
enable users to select, download, and view videos on computer clients;
enable the users to upload video ratings for videos downloaded on the respective computer clients;
determine a producer rating for each of the producers based on a video rating associated with at least one of the videos uploaded from computer clients; and
publish the producer ratings on the website.

11. The system of claim 10, wherein the one or more servers are designed to login information for the users.

12. The system of claim 11, wherein the one or more servers are designed to:
receive and storing user preference information or user profile information from the users; and
select videos to download to the computer client based on the user preference information, the user profile information, or both.

13. The system of claim 12, wherein the videos downloaded on the computer client are downloaded serially in a stream.

14. The system of claim 12, wherein the videos downloaded on the computer client are selected based upon the user preference information and wherein the user preference information specifies a broadcast time period.

15. The system of claim 10, wherein the one or more servers are further designed to enable the users to selectively block the videos uploaded by specific producers.

16. The system of claim 10, wherein the one or more servers are further designed to, when publishing a website video for download, associate a corresponding producer rating relating to the producer that uploaded the website video.

17. The system of claim 10, wherein the one or more servers are further designed to provide access to some videos while preventing access to others, based on the producer ratings.

18. The system of claim 10, wherein the one or more servers are further designed to: enable a user to select a point of view with respect to the topic; and download a video that corresponds to the point of view that is selected by the user.

19. A non-transitory computer-readable medium embodying a program executable in one or more computer servers that are communicatively coupled to the Internet and provide a website for uploading and downloading videos produced by users, the program comprising:
code that searches content on the Internet;
code that identifies a topic from the searched content, the topic indicative of currently relevant news or events, the topic indicative of a type of video that will be requested for uploading from producers; wherein an upload area (UA) located on the website is used for filing and storing uploaded videos based on a predefined topic;
code that publishes the topic on the website, the topic indicative of a type of videos that are requested for uploading;
code that receives and stores videos uploaded from computer clients, the videos being associated with producers of the videos;
code that enables users to select, download, and view videos on computer clients;
code that enables the users to upload video ratings for videos downloaded on the computer clients;
code that determines a producer rating for each of the producers based on a video rating associated with at least one of the videos uploaded from computer clients; and
code that publishes the producer ratings on the website.

20. The non-transitory computer-readable medium of claim 19, wherein the program further comprises:
code that receives and stores user preference information or user profile information from the users; and
code that selects videos to download on the computer client based on the user preference information, the user profile information, or both.

21. The non-transitory computer-readable medium of claim 20, wherein the user preference information specifies a broadcast time period.

22. The non-transitory computer-readable medium of claim 20, wherein the user preference information enables the users to selectively exclude the uploaded video from specific producers.

23. The non-transitory computer-readable medium of claim 20, wherein the user preference information enables the users to selectively include or exclude the video to download on the computer client based on the producer rating associated with the video.

24. The non-transitory computer-readable medium of claim 19, wherein the program further comprises:

code that enables producers to associate a point of view with a video;
code that enables a user to select a point of view with respect to a topic; and
code that selects videos to download on the computer client based on the user selected point of view.

\* \* \* \* \*